(12) United States Patent
Little et al.

(10) Patent No.: US 11,124,105 B2
(45) Date of Patent: Sep. 21, 2021

(54) SOLID WASTE DISPLACEMENT SYSTEM

(71) Applicants: Keith Little, Odessa, TX (US); James Harwell, Odessa, TX (US)

(72) Inventors: Keith Little, Odessa, TX (US); James Harwell, Odessa, TX (US)

( * ) Notice: Subject to any disclaimer, the term of this patent is extended or adjusted under 35 U.S.C. 154(b) by 0 days.

(21) Appl. No.: 15/067,007

(22) Filed: Mar. 10, 2016

(65) Prior Publication Data

US 2017/0259996 A1    Sep. 14, 2017

(51) Int. Cl.
| | | |
|---|---|---|
| *B60P 1/36* | (2006.01) | |
| *B65F 3/28* | (2006.01) | |
| *B65F 3/20* | (2006.01) | |
| *B65G 67/24* | (2006.01) | |

(52) U.S. Cl.
CPC ............... *B60P 1/365* (2013.01); *B65F 3/28* (2013.01); *B65F 3/203* (2013.01); *B65F 3/207* (2013.01); *B65G 67/24* (2013.01)

(58) Field of Classification Search
CPC .......... B60P 1/006; B60P 1/365; B65F 3/207; B65F 3/28; B65G 67/24
USPC ................................................ 414/514, 521
See application file for complete search history.

(56) References Cited

U.S. PATENT DOCUMENTS

| | | | | | |
|---|---|---|---|---|---|
| 2,129,337 A | * | 9/1938 | Spears | ................ | B65G 67/24 |
| | | | | | 198/834 |
| 2,258,988 A | * | 10/1941 | Le Laurin | ................ | B65F 3/28 |
| | | | | | 414/514 |
| 2,710,105 A | * | 6/1955 | Schwartz | ................ | B60P 1/365 |
| | | | | | 414/522 |
| 2,823,814 A | * | 2/1958 | Schonrock | ................ | B65F 3/28 |
| | | | | | 414/514 |
| 3,572,563 A | * | 3/1971 | Oliver | ................ | B60P 1/52 |
| | | | | | 414/514 |
| 4,685,856 A | * | 8/1987 | Hesse, Jr. | ................ | B60P 1/006 |
| | | | | | 414/521 |
| 5,413,451 A | * | 5/1995 | Pellegrino | ................ | B60P 1/365 |
| | | | | | 414/523 |
| 8,257,007 B2 | * | 9/2012 | Williams | ................ | B60P 1/006 |
| | | | | | 414/345 |
| 2017/0008441 A1 | * | 1/2017 | Quenzi | ................ | B60P 1/003 |

FOREIGN PATENT DOCUMENTS

| | | | | | |
|---|---|---|---|---|---|
| EP | 0360235 A2 | * | 3/1990 | .............. | B60P 1/006 |
| GB | 2191755 A | * | 12/1987 | ................ | B60P 1/38 |

* cited by examiner

*Primary Examiner* — James Keenan

(74) *Attorney, Agent, or Firm* — William S. Parks

(57) ABSTRACT

A solid waste displacement system, more specifically a system affixed to a mobile structure (such as, for instance, a truck bed, a trailer, and the like), provided. Such a system includes a drive shaft coupled to a movable wall assembly that provides sufficient force to push solid waste from the mobile structure along the drive shaft when operated. The drive shaft may be a chain driven device or any other like mechanism that accords movement and force to the movable wall assembly for such a solid waste displacement purpose. The device as well as the method of utilizing such a device on and/or within a mobile structure are encompassed herein.

10 Claims, 3 Drawing Sheets

SOLID WASTE DISPLACEMENT SYSTEM

FIELD OF THE INVENTION

The present disclosure relates to a solid waste displacement system, more specifically a system affixed to a mobile structure (such as, for instance, a truck bed, a trailer, and the like). Such a system includes a drive shaft coupled to a movable wall assembly that provides sufficient force to push solid waste from the mobile structure along the drive shaft when operated. The drive shaft may be a chain driven device or any other like mechanism that accords movement and force to the movable wall assembly for such a solid waste displacement purpose. The device as well as the method of utilizing such a device on and/or within a mobile structure are encompassed herein.

BACKGROUND OF THE INVENTION

The disclosed subject matter provides a system for the facilitation of displacement of solid waste articles placed within the bed or surface of a mobile structure. The system may comprise components for removing solid waste articles from structures such as a truck bed, an open trailer bed, a trailer surface, and any other type of mobile structure with available volume and space for the placement of solid waste articles. In an oil rig (or construction) setting, as non-limiting examples, trucks and/or trailer are utilized to perform tasks such as loading and unloading equipment and other construction paraphernalia. Subsequent to delivery of any such items, if at all, these mobile structures have been utilized for the placement of solid waste products, ranging from used, emptied cans to metal scraps to anything else needing removal from such a site. In some circumstances, open, large metal bins have been transported to such sites for placement of waste objects with subsequent removal of the entire bin itself. Such a large bin is then dumped into a landfill or like location (like a furnace, for instance to incinerate such waste articles). On occasion, however, the cost for the transport of such a large metal bin, as well as the total volume thereof in relation to the waste article amounts and types at certain sites, are not justified for such an alternative. As well, the locations involved may be too remote and difficult to access for such large metal structures. Thus, there exists a need to provide smaller mobile structures with the capability and capacity to handle such waste article removal from such a site with the added benefit of facilitating displacement of such waste articles on demand and without need for further handling by humans from such a mobile structure.

Ostensibly, then, people have utilized such mobile structures for such waste removal purposes. Such solid waste articles, particular at oil rig sites and other like places, are potentially hazardous, not only to the environment, but also to those working at the site. As a result, workers have tended to utilize mobile structures as primary means for solid waste removal from such locations, throwing such potentially dangerous and toxic waste articles into truck beds, into trailer beds, onto trailer surfaces, and the like, as a means to pick up such material from the ground at and near the location for transport to a proper waste facility. The main problem, as noted above, is that such hazardous material is bad enough in terms of being handled initially for truck bed, etc., placement; removal from such a mobile structure is then needed, as well. Such solid waste material may also harm the mobile structure itself (at least to a certain extent), thereby effecting the value of such a vehicle or other type of wheeled device, whether owned by the user or borrowed or rented for such a purpose. The lack of a device to accommodate such a desirable mobile structure bed and/or surface solid waste removal action thus exacerbates the overall problem associated with such solid waste removal issues. Thus, a need exists to provide such a beneficial system to alleviate and/or reduce the propensity of potentially harmful contact with such solid waste materials from such locations. There is currently no efficient means for cleaning the backs of these trucks quickly and efficiently.

ADVANTAGES AND BRIEF SUMMARY OF THE INVENTION

A distinct advantage of the disclosed subject matter is the ability to force and displace situated solid waste material from a mobile structure bed and/or surface without any need for contact or touching by a human. Another distinct advantage is the automated action accorded such a user by the disclosed subject matter, as well as the ability to maximize the surface area of the mobile structure itself for such solid waste material placement prior to activation thereof for hands-free removal.

A mobile structure including a solid waste displacement device, said mobile structure comprising at least one base wheel having a horizontal extended surface situated above said at least one base wheel, said solid waste displacement device comprising a linear drive shaft and a vertical wall assembly, wherein said solid waste displacement device is incorporated to said mobile structure through said drive shaft integrated with and running longitudinally along said horizontal extended surface, wherein said drive shaft moves along said longitudinal path on demand, and said wall assembly moves longitudinally with said drive shaft when in operation, wherein said wall assembly and said drive shaft provide sufficient force upon operation along said longitudinal path to displace any solid waste therefrom said mobile structure horizontal extended surface. The mobile structure may be selected from an automated vehicle and a connected wheeled structure, wherein said automated vehicle may be a truck (or other like vehicle, such as, without limitation, a jeep, a dump truck, and said horizontal extended surface is a truck bed, jeep bed, and the like, and wherein said connected wheeled structure may be a trailer, or any other like structure, including an open structure having three vertical sides and the horizontal base, a flat trailer bed, a double-sided trailer, etc., with the horizontal extended surface potentially a trailer bed (with any number of sides defining the bed) and a trailer surface.

The disclosed subject matter provides a system. The system may comprise a power unit having a rotatable output shaft. The power unit may be circuitally coupled to a battery of a motorized vehicle in order to draw power. The power drawn may be utilized by the rotatable output shaft to rotate a drive shaft that may be rotatably coupled to the rotatable output shaft of the power unit. In embodiments, the first coupling may affix the rotatable output shaft to the drive shaft. The drive shaft may be supported for rotation about a longitudinal drive shaft axis. In embodiments, the drive shaft may extend from the first coupling to a second coupling. Each of a first set of bearing support members may comprise at least one orifice. In embodiments, the first set of bearing support members may be fixed and may extend vertically relative to the at least one support base.

The system may further comprise a first set of sealed bearings threadably affixed to the first set of bearing support members of the at least one support base. A first shaft may be rotatably coupled to the drive shaft in driven relationship via a second coupling. In embodiments, the first shaft may penetrate at least one orifice of each of the first set of bearing support members.

The system may further comprise at least one driven sprocket that may comprise a first set of teeth and may be coupled to the first shaft for rotation therewith (hereinafter referred to as first driven sprocket or sprockets). In embodiments, such a first driven sprocket or sprockets may be positioned between at least two of the first set of bearing support members.

The system may further comprise one of the at least one support base including a second set of bearing support members supported in fixed relationship with the at least one support base. Each of the second set of bearing support members may comprise at least one orifice.

The system may further comprise a second set of sealed bearings threadably affixed to the second set of bearing support members of the at least one support base. A first shaft may align with an axis parallel the drive shaft axis. In embodiments, the second shaft may penetrate at least one orifice of each of the second set of bearing support members.

The system may further comprise at least one driven sprocket that may comprise a second set of teeth and may be coupled to the second shaft for rotation therewith (hereinafter referred to as second driven sprocket or sprockets). In embodiments, such a second driven sprocket or sprockets may be positioned between at least two of the second set of bearing support members.

The system may further comprise a chain guide that may extend from the first set of bearing support members to the second set of bearing support members.

A traveling waste displacement assembly may be movable along a displacement axis between a retracted position and an extended position. In embodiments, the traveling waste displacement assembly may comprise a traveling guide configured to move along the chain guide between a retracted position and an extended position. In embodiments, the traveling guide may be translationally engageable with the chain guide. In embodiments, the traveling guide may be pulled along the displacement axis when the first driven sprocket or sprockets is/are rotated.

The traveling waste displacement assembly may further comprise a wall carried at least in part by the traveling guide for translational movement therewith.

The system may further comprise a roller chain trained about the first set of teeth and second set of teeth. In embodiments, the roller chain may be coupled to the traveling guide.

In embodiments, the roller chain may move along the displacement axis when the at least one first driven sprocket is rotated. In embodiments, the roller chain may move in a rounded path.

In embodiments, the first shaft may penetrate an orifice of each first driven sprocket. In embodiments, the second shaft may penetrate an orifice of each second driven sprocket In embodiments, at least one of the at least one support base may be affixed to a truck bed. In embodiments, at least one of the first support base may be affixed to a truck bed adjacent a truck cab portion. In embodiments, elements of the solid waste displacement system may be threadably affixed to a truck bed.

The disclosure may further provide embodiments of the system incorporated onto a trailer. The system may be positioned in order to allow the traveling waste displacement assembly to translate a length of a trailer on a displacement axis that is parallel with the length of the trailer. In embodiments, at least the at least one support base may be affixed to the trailer.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features, and advantages here provided will become apparent to one with skill in the art upon examination of the following FIGURES and detailed description. It is intended that all such additional systems, methods, features, and advantages that are included within this description, be within the scope of the appended claims and/or those claims filed later.

BRIEF DESCRIPTION OF THE DRAWINGS

The novel features believed characteristic of the disclosed subject matter will be set forth in any claims that are filed. The disclosed subject matter itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF ILLUSTRATIVE EMBODIMENTS

Reference now should be made to the drawings, in which the same reference numbers are used throughout the different figures to designate the same components.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Figure 1:
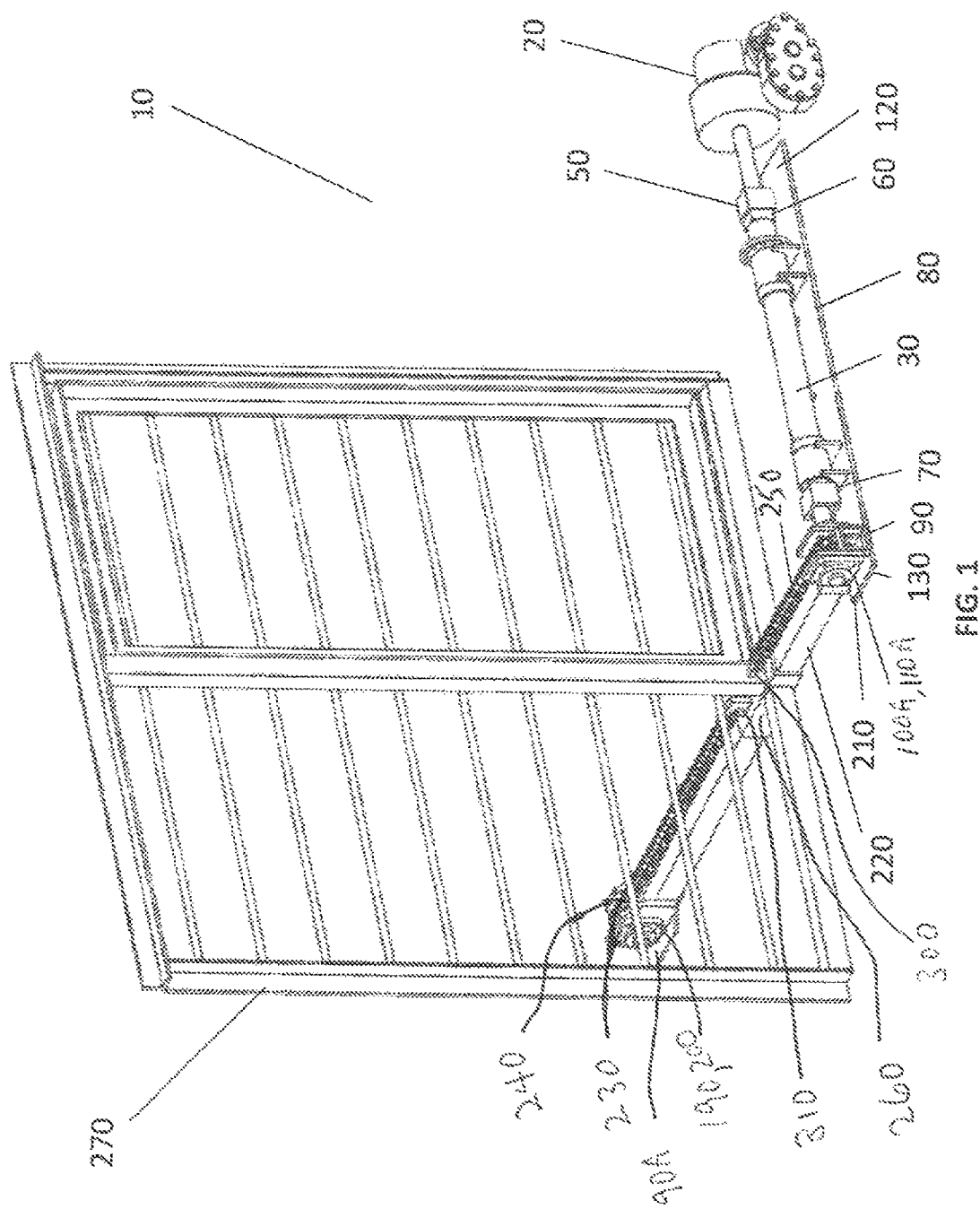
FIG. 1 displays a perspective view of a solid waste displacement system in accordance with embodiments.

FIG. 1 displays a perspective view of a solid waste displacement system 10 in accordance with embodiments.

The system 10 may comprise a power unit 20 having a rotatable output shaft 40. The power unit 20 may be circuitally coupled to a battery of a motorized vehicle (not illustrated) in order to draw power. In embodiments, the power unit 20 may be portable.

The power drawn may be utilized by the rotatable output shaft 40 to rotate a drive shaft 30 that may be rotatably coupled to the rotatable output shaft 40 of the power unit 20, through a misalignment coupler 50. In embodiments, the first coupling 60 may affix the rotatable output shaft 40 to the drive shaft 30. The drive shaft 30 may be supported for rotation about a longitudinal drive shaft axis. In embodiments, the drive shaft 30 may extend from the first coupling 60 to a second coupling 70. In embodiments, the drive shaft 30 may comprise all of the characteristics of a conventional drive shaft and may set upon a lengthwise support 80.

Figure 2:
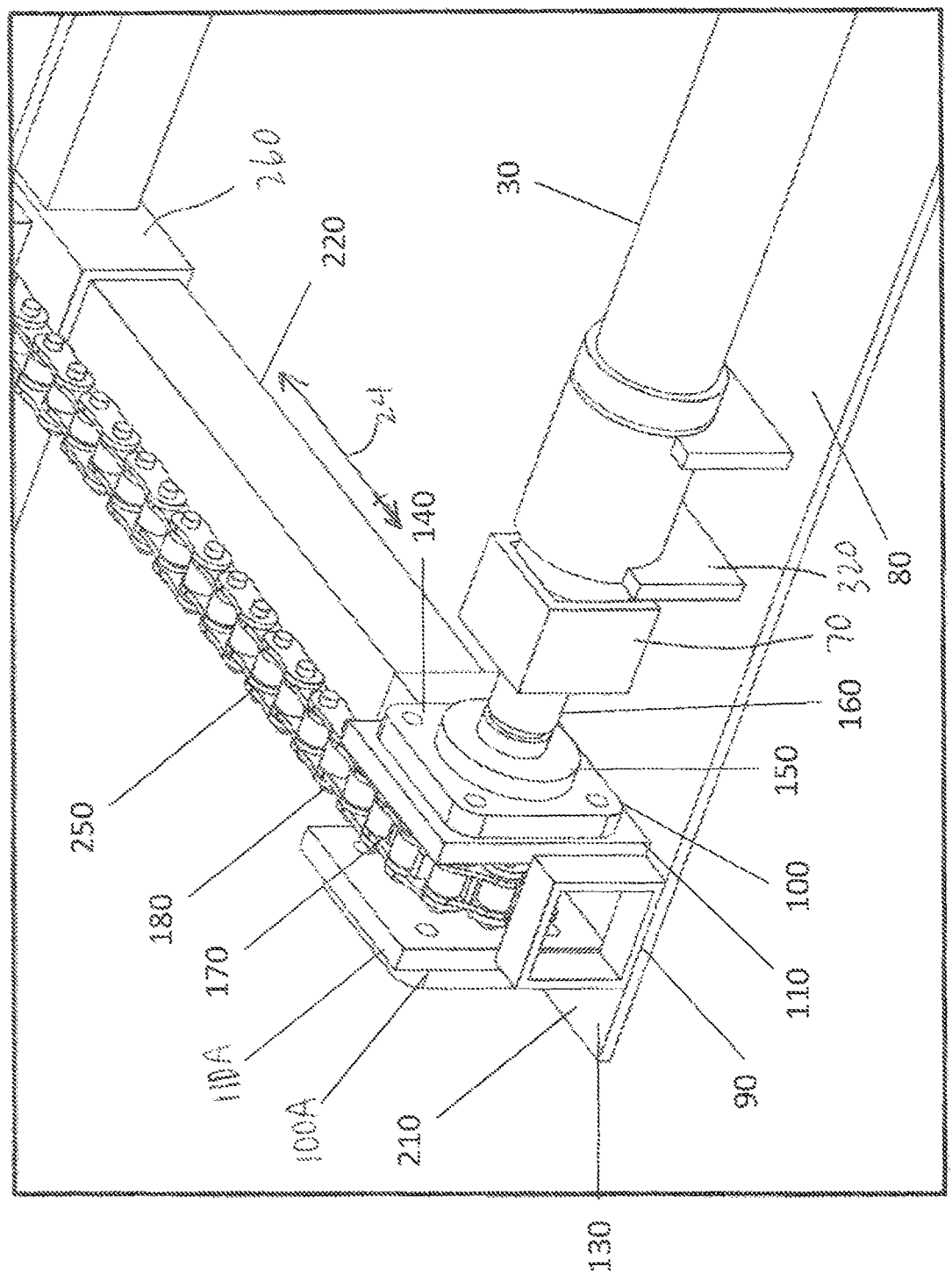
FIG. 2 displays a zoomed-in view of a coupling portion of a solid waste displacement system in accordance with embodiments.

FIG. 2 displays a zoomed-in view of a coupling portion 12 of a solid waste displacement system in accordance with embodiments. A portion of at least one coupling support base 90 may be shown including a first set of bearing support members 100,110 (in FIGS. 1 and 2 there is provided an opposing set of bearing support members 100A, 110A thereto said first set). Each of the first set of bearing support members 100,110 may comprise at least one orifice (not illustrated). In embodiments, the first set of bearing support members 100,110 (as well as the opposing set of bearing support members 100A, 110A of FIG. 1) may be fixed and may extend vertically relative to the at least one support base 90. In embodiments, at least one of the support bases 90 may comprise metal. In embodiments, at least one of the at least one support base 90 may comprise a substantially rectangular shape and the lengthwise support may comprise a first end 120 (adjacent to such a support base 90 is configured) and a second end (130 in FIG. 1). In embodiments, at least one of the at least one orifice (not illustrated) of the first set of bearing support members 100,110 (as well as the opposing set of bearing support members 100A, 110A of FIG. 1) may be threaded. In embodiments, at least one of the at least one orifice (not illustrated) of the first set of bearing support members 100,110 (as well as the opposing set of bearing support members 100A, 110A of FIG. 1) may not be threaded.

In embodiments, the first set of bearing support members 100, 110 (as well as the opposing set of bearing support members 100A, 110A of FIG. 1) may comprise another set of bearing support members. In embodiments, the first set of bearing support members 100,110 (as well as the opposing set of bearing support members 100A, 110A of FIG. 1) may be affixed (via welding, as one example) to one side of a support base 90 or may alternatively be cast with the lengthwise support 80. The first set of bearing support members 100,110 (as well as the opposing set of bearing support members 100A, 110A of FIG. 1) may extend in a direction perpendicular to the length of the lengthwise support 80. In embodiments, the first set of bearing support members 100,110 (as well as the opposing set of bearing support members 100A, 110A of FIG. 1) may resemble flat squares that may have surfaces that may align with the axis of the drive shaft 30.

The system 10 may further comprise a first set of sealed bearings (not illustrated) threadably affixed to the first set of bearing support members 100,110 (as well as the opposing set of bearing support members 100A, 110A of FIG. 1) of the at least one lengthwise support 80. In embodiments, the first set of bearing support members 100,110 (as well as the opposing set of bearing support members 100A, 110A of FIG. 1) may be threadably affixed via means such as, but not limited to, at least one screw 140. In embodiments, a sealed bearing (150 in FIG. 1) may cover a majority of a face of one of a first set of bearing support members 100,110 (as well as the opposing set of bearing support members 100A, 110A of FIG. 1).

A first shaft 160 may be rotatably coupled to the drive shaft 30 in driven relationship via the second coupling 70. In embodiments, the first shaft 160 may align with the axis of the drive shaft 30. In embodiments, the first shaft 160 may penetrate at least one orifice (not illustrated) of each of the first set of bearing support members 100,110 (as well as the opposing set of bearing support members 100A, 110A of FIG. 1). In embodiments, the first shaft 160 may further be contained within the first set of sealed bearings (not illustrated) so that the first shaft 160 may rotate smoothly when responding to the rotation of the drive shaft 30.

The system 10 may further comprise at least one first driven sprocket 170. Each first driven sprocket 170 may comprise a first set of teeth 180 and may be coupled to the first shaft 160 for rotation therewith. In embodiments, at least one first drive sprocket 170 may be positioned between the first set of bearing support members 100,110 and the opposing set of bearing support members (100A, 110A of FIG. 1).

Figure 3:
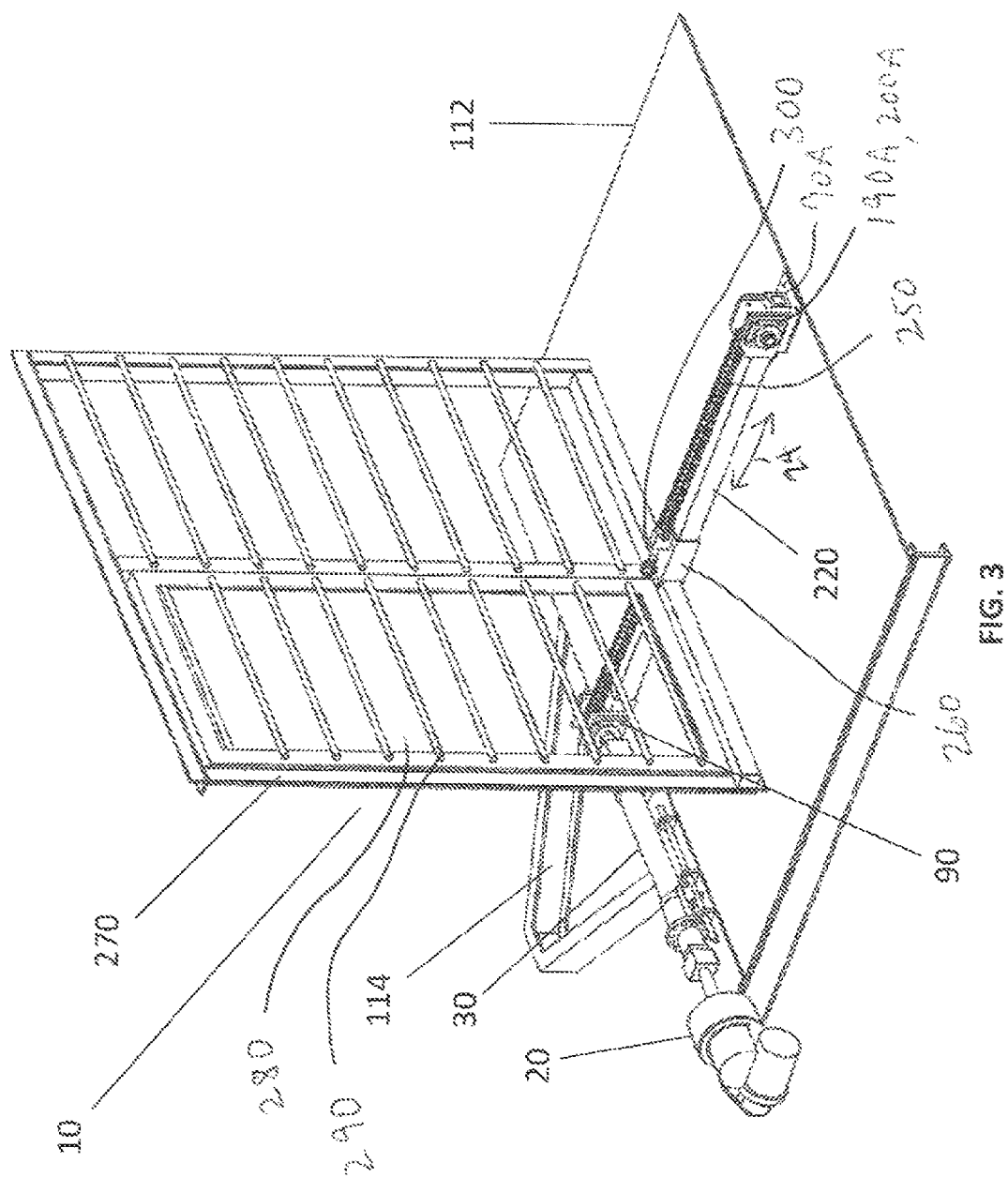
FIG. 3 displays a perspective view of a solid waste displacement system affixed to a truck bed in accordance with embodiments.

The system 10 may further comprise one of the at least one support base 90 including a second set of bearing support members 190,200 (as well as an opposing set of bearing support members 190A, 200A of FIG. 3) supported in fixed relationship with the at least one support base 90A. Each of the second set of bearing support members 190,200 (as well as the opposing set of bearing support members 190A, 200A of FIG. 3) may comprise at least one orifice (not illustrated). In embodiments, the second set of bearing support members 190,200 (as well as the opposing set of bearing support members 190A, 200A of FIG. 3) may be fixed and may extend vertically relative to the at least one support base 90A. In embodiments, at least one of the support bases 90A may comprise metal. In embodiments, at least one of the at least one orifice (not illustrated) of the second set of bearing support members 190,200 (as well as the opposing set of bearing support members 190A, 200A of FIG. 3) may be threaded. In embodiments, at least one of the at least one orifice (not illustrated) of the second set of bearing support members 190,200 (as well as the opposing set of bearing support members 190A, 200A of FIG. 3) may not be threaded.

In embodiments, the second set of bearing support members 190,200 (as well as the opposing set of bearing support members 190A, 200A of FIG. 3) may comprise two bearing support members. In embodiments, the second set of bearing support members 190,200 (as well as the opposing set of bearing support members 190A, 200A of FIG. 3) may be affixed (via welding) to one side of a support base 90A or may alternatively be cast with the support base 90A. The second set of bearing support members 190,200 (as well as the opposing set of bearing support members 190A, 200A of FIG. 3) may extend in a direction perpendicular to a length of the support base 90A along a displacement axis 24 aligned with a chain guide 220. In embodiments, the second set of bearing support members 190,200 (as well as the opposing set of bearing support members 190A, 200A of FIG. 3) may resemble flat squares that may have surfaces that may align with the displacement axis 24.

The system 10 may further comprise a second set of sealed bearings (not illustrated) threadably affixed to the second set of bearing support members 190,200 (as well as the opposing set of bearing support members 190A, 200A of FIG. 3) of the chain guide 220. In embodiments, the second set of bearing support members 190,200 (as well as the opposing set of bearing support members 190A, 200A of FIG. 3) may be threadably affixed via means such as, but not limited to, at least one screw (such as 150 in FIG. 2). In embodiments, a sealed bearing (not illustrated) may cover a majority of a face of one of a second set of bearing support members 190,200 (as well as the opposing set of bearing support members 190A, 200A of FIG. 3).

As noted above, a chain guide 220 may align with an axis parallel with the displacement axis 24. In embodiments, the chain guide 220 may penetrate at least one orifice (not illustrated) of each of the first set 100,110 and opposing set of bearing support members 100A, 110A and each of the second set 190,200 and opposing set of bearing support members 190A,200A. In embodiments, the second shaft (not illustrated) may further be contained within the second set of sealed bearings (not illustrated) so that the second shaft (not illustrated) may rotate smoothly when rotating.

The system 10 may further comprise at least one second driven sprocket or sprockets 230. Each second driven sprocket 230 may comprise a second set of teeth 240 and may be coupled to the second shaft (not illustrated) for rotation therewith. In embodiments, at least one second drive sprocket 230 may be positioned between the second set of bearing support members 190,200 and the opposing set of bearing support members (190A, 200A of FIG. 3).

In embodiments, the second set of bearing support members 190,200 (as well as the opposing set of bearing support members 190A, 200A of FIG. 3) may be spaced apart from the first set of bearing support members 100,110 (as well as the opposing set of bearing support members 100A, 110A of FIG. 1) along the displacement axis 24.

The system 10 may further comprise a chain guide 220 that may extend from the first set of bearing support members 100,110 (as well as the opposing set of bearing support members 100A, 110A of FIG. 1) to the second set of bearing support members 190,200 (as well as the opposing set of bearing support members 190A, 200A of FIG. 3). In embodiments, the chain guide 220 may be affixed (welded, etc.) to the first (and opposing) and second (and opposing) sets of bearing support members 100,110,100A,110A,190, 200,190A,200A. In embodiments, the chain guide 220 may be affixed (welded, etc.) to the support base 90 and opposing support base 90A. In embodiments, the chain guide 220 may be at least partially hollow.

Such a traveling waste displacement assembly (overall system 10) may be movable along such a displacement axis 24 between a retracted position and an extended position along the chain guide 220 in relation to the movement allowed for the chain 250 in relation to the two opposing sets of opposing bearings 100,110,100A,110A,190,200,190A, 200A. In embodiments, then, the traveling waste displacement assembly 10 may comprise a traveling guide 260 configured to move along the chain guide 220 between a retracted position and an extended position. In embodiments, the traveling guide 260 may be translationally engageable with the chain guide 220. In embodiments, the traveling guide 260 may be pulled along the displacement axis 24 when the at least one first driven sprocket 170 is rotated. The waste displacement assembly 10 includes a movable wall 270 that, in embodiments, is connected with such a traveling guide 260 such that upon operation of said chain 250 within the chain guide 220, the wall 270 moves itself between the retracted and extended positions thereof. Such a wall 270 may include, in embodiments open segments 280 that may further, if desired, include (without any requirement thereof) closable windows portions 290. The chain guide 220 may, in embodiments, include chain end holders 300,310 on the traveling guide 260 in order to provide the capability of moving such a wall 270 (and thus traveling guide 260) between retracted and extended positions. This permits the wall 270 to be moved, on demand, along the chain guide 220 and displacement axis 24 for the purpose of pushing, forcing, etc., any solid (or possibly liquid) materials (not illustrated) in the same direction of such movement.

For the purposes of this disclosure, the term "translationally engageable" may refer to an element of the system 10 that may be translated within or on a second element on which the first element is engaged.

The traveling waste displacement assembly 10 may, as noted above, further comprise a wall 270 carried at least in part by the traveling guide 260 for translational movement therewith. In embodiments, the wall 270 may extend perpendicularly outward from the traveling guide 260 and the chain guide 220. In embodiments, the wall 270 may be welded to the traveling guide 260.

The system 10 may, as noted above, further comprise a roller chain 250 trained about the first set of teeth 180 and second set of teeth 240 of the sprockets 170,230. In embodiments, the roller chain 250 may be coupled to the traveling guide 260 through the end holders 300, 310. In embodiments, the roller chain 250 may be coupled to the traveling guide 250 via at least two traveling guide orifices (such as the end holder 300,310) penetrated by at least two bushes (not illustrated) of the roller chain 250. The orifices 300, 310 may be found on opposite ends of the traveling guide 260.

In embodiments, the roller chain 250 may move along the displacement axis 24 when the at least one first driven sprocket 170 is rotated. In embodiments, the roller chain 250 may move in a rounded path. The path may include the chain 250 traveling around the at least one first driven sprocket 170 and the at least one second driven sprocket 230. The path may further include the chain 250 traveling within the chain guide 220. In embodiments, the chain guide 220 may house at least a portion of the roller chain 250 whether the roller chain 250 is in motion or is not in motion.

In embodiments, the first shaft 160 may penetrate an orifice (not illustrated) of each first driven sprocket 170. In embodiments, the second driven sprocket 230 may rotate around a short shaft (not illustrated) held between the second set of bearing members 190,200 through an orifice (not illustrated) within each second driven sprocket 230. In embodiments, the shafts (such as 160 for the first sprocket 170) may maintain engagement with the sprockets 170,230 via friction between the edge of the orifices (not illustrated) and the exterior surface of the shafts (such as 160). In embodiments, the shafts (160, etc.) may maintain engagement with the sprockets 170,230 via male-female engagement between the edge of the orifices (not illustrated) and the exterior surface of the shafts (160, etc., not illustrated).

FIG. 3 displays a perspective view of a solid waste displacement system 10 affixed to a flat surface (such as a truck bed, trailer bed, and the like) 112 in accordance with embodiments. In embodiments, at least one of the at least one lengthwise support 80 may be affixed to such a flat surface (again, such as a truck bed) 112. In embodiments, at least one of the lengthwise support base 80 may be affixed to, in embodiments, a truck bed adjacent a truck cab portion (not illustrated), or the edge adjacent a trailer connection structure 114. In embodiments, elements of the solid waste displacement system 110 may be threadably affixed to such a flat surface 112, or welded, or other reliable connection, thereto.

In embodiments, the at least one lengthwise support 80 may each comprise at least one support element 90. In embodiments, the at least one support element 90 may support, as in FIGS. 1 and 2, at least one bearing portion (not illustrated) of the drive shaft 30. In embodiments, the at least one bearing portion (not illustrated) may be supported via rounded supports 320 (as seen in FIGS. 1 and 2). The rounded supports 320 may protrude from the at least one lengthwise support 80 and may comprise a rounded interior section on which the at least one bearing portion (not illustrated) may rest.

In embodiments, the first shaft 160 may penetrate each of at least one orifice (not illustrated) of the plurality of support walls 90 of the lengthwise support 80 and the first plurality of sealed bearings (not illustrated).

In embodiments, at least one of the first couplings 60 and the second couplings 70 may be misalignment couplings. In embodiments, misalignment couplings (in relation to the disclosure) may allow for changes in alignment of the rotatable output shaft 40, the drive shaft 30, and the first shaft 160 due to operating conditions, etc.

In embodiments, at least one of the first set of sealed bearings (not illustrated) and the second set of sealed bearings (not illustrated) may be flange bearings.

In embodiments, the chain guide 220 may be substantially square prismatic. In embodiments, a portion of the traveling guide 260 that is configured to move along the chain guide 220 may be substantially square prismatic. In embodiments, a portion of the traveling guide 260 that is configured to move along the chain guide 220 may be substantially cylindrical.

In embodiments, at least one of the first shaft 160 and second shaft (not illustrated, coupled with the second sprocket 230) may comprise stress proof steel. In embodiments, at least one of the first shaft 160 and second shaft (not illustrated) may comprise polymer.

In embodiments, the electricity from the battery/power unit 20 may power the rotatable output shaft 40 and may cause it to rotate. In embodiments, the rotation of the rotatable output shaft 40 may cause the drive shaft 30 to rotate. In embodiments, the rotation of the drive shaft 30 may cause the first shaft 160 to rotate. In embodiments, the rotation of the first shaft 160 may cause the at least one first driven sprocket 170 to rotate. In embodiments, the rotation of the at least one first driven sprocket 170 may cause the chain 250 to move along the displacement axis 24 via the chain guide 220, thereby also causing the at least one second driven sprocket 230 and the second shaft (not illustrated) to rotate. In embodiments, then, the rotation of the at least one first driven sprocket 170 and the at least one second driven sprocket 230 may cause the roller chain 250 to move along the displacement axis 24 and rotate around such sprockets 170,230 until the traveling guide 260 attached to such a chain 250 moves along the chain guide 220 until reaching one end holder 300 or the other 310, thereby defining a retracted or extended position. In embodiments, the rotation of the roller chain 250 may then cause, through these actions, the traveling waste displacement assembly 10 to translate along the displacement axis 24, permitting such a wall 270 to displacement any solid (or liquid) waste materials (not illustrated) along the flat surface 112 until such materials (not illustrated) are forced from the flat surface 112, adjacent the second set of bearing members 190,200.

In embodiments, the rotatable output shaft 40, the drive shaft 30, the first shaft 160, the at least one first drive sprocket 170, the interior of the first set of sealed bearings 100,110, the roller chain 250, the traveling wall assembly 270, the second shaft (not illustrated), the at least one second drive sprocket 230, and the interior of the second set of sealed bearings 190,200 may all simultaneously be moving (rotating, translating, etc.) at one time.

Embodiments of the system 10 may be incorporated onto a trailer (or any other like mobile structure)(such as the flat surface 112 of FIG. 3). The system 10 may be positioned in order to allow the traveling waste displacement assembly (wall) 270 to translate a length of a trailer on a displacement axis 24 that is parallel with the length of the trailer (flat surface 112, for instance). In embodiments, at least the at least one lengthwise support 80 may be affixed to the trailer (flat surface 112, again, for instance). In embodiments, other elements of the solid waste displacement system 10 may be affixed to the trailer (flat surface 112). In embodiments, the at least one lengthwise support 80 may be threadably affixed thereto. In embodiments, the at least one lengthwise support 80 may be affixed via rivets, welds, and the like, as well.

In embodiments, the system 10 may additionally displace waste in liquid form.

As such, the wall assembly (that provides a sufficient height and width to force solid waste materials from substantially the entirety of the subject mobile structure when activated and moving along the drive shaft 30) may be of a completely solid structure, composed of a number of solid blocks (whether wooden, metal, plastic, and the like) attached to a base structure, or any other geometric structure for such a purpose. The flat wall configuration thus allows for stowing on a side of the mobile structure bed and/or surface to allow for maximum space for solid waste article placement on the mobile structure, with subsequent movement along the drive shaft to displace such solid waste materials on demand and in a hands-free mode.

While this disclosure has been particularly shown and described with reference to preferred embodiments thereof and to the accompanying drawings, it will be understood by those skilled in the art that various changes in form and details may be made therein without departing from the spirit of this disclosure. Therefore, the scope of the disclosure is defined not by the detailed description but by the appended claims.

What is claimed is:

1. A solid waste displacement system, comprising:
a power unit having a rotatable output shaft;
a traveling waste displacement assembly movable along a displacement axis between a retracted position and an extended position;
a drive shaft rotatably coupled to the power unit via a first coupling, the drive shaft supported for rotation about a longitudinal drive shaft axis, the drive shaft extending from the first coupling to a second coupling;
at least one support base comprising a first set of bearing support members each comprising at least one orifice, the first set of bearing support members fixed and extending vertically relative to the at least one support base; a first set of sealed bearings threadably affixed to the first set of bearing support members of the at least one support base;
a first shaft rotatably coupled to the drive shaft in driven relationship, the first shaft penetrating the at least one orifice of each of the first set of bearing support members; at least one first drive sprocket each comprising a first set of teeth, the at least one first drive sprocket coupled to the first shaft for rotation therewith, the at least one first drive sprocket positioned between at least two of the first set of bearing support members of the at least one support base; a second set of bearing support members supported in fixed relationship with the at least one support base, the second set of bearing support members spaced apart from the first set of bearing support members along the displacement axis, the second set of bearing support members each comprising at least one orifice;

a second set of sealed bearings threadably affixed to the second set of bearing support members; a second shaft penetrating the at least one orifice of each of the second set of bearing support members; at least one second drive sprocket each comprising a second set of teeth, the at least one second drive sprocket coupled to the second shaft for rotation therewith, the at least one second drive sprocket positioned between at least two of the second set of bearing support members of the at least one support base; and a chain guide extending from the first set of bearing support members to the second set of bearing support members;

said traveling waste displacement assembly comprising: a traveling guide configured to move along the chain guide between a retracted position and an extended position, the traveling guide translationally engageable with the chain guide; a wall carried at least in part by the traveling guide for translational movement therewith, the wall extending perpendicularly outward from the traveling guide and the chain guide; and a roller chain trained about the first set of teeth and the second set of teeth, the roller chain coupled to the traveling guide.

2. The system of claim 1, wherein said traveling guide pulls along the displacement axis when said at least one first drive sprocket is rotated.

3. The system of claim 1, said roller chain moving along the displacement axis when said at least one first drive sprocket is rotated.

4. The system of claim 1, at least one of the first shaft and second shaft comprising stress-proof steel.

5. The system of claim 1, wherein said chain guide houses at least a portion of the roller chain.

6. The system of claim 1, wherein at least one of said first coupling and said second coupling is a misalignment coupling.

7. The system of claim 1, wherein said at least one support base each comprises at least one support element.

8. The system of claim 7, wherein said at least one support element supports at least one bearing portion of the drive shaft.

9. A trailer system comprising:

a power unit having a rotatable output shaft; a traveling waste displacement assembly movable along a displacement axis between a retracted position and an extended position;

a drive shaft rotatably coupled to the power unit via a first coupling, the drive shaft supported for rotation about a longitudinal drive shaft axis, the drive shaft extending from the first coupling to a second coupling;

at least one support base comprising a first set of bearing support members each comprising at least one orifice, the first set of bearing support members fixed and extending vertically relative to the at least one support base;

a first set of sealed bearings threadably affixed to the first set of bearing support members of the at least one support base; a first shaft rotatably coupled to the drive shaft in driven relationship, the first shaft penetrating the at least one orifice of each of the first set of bearing support members;

at least one first drive sprocket each comprising a first set of teeth, the at least one first drive sprocket coupled to the first shaft for rotation therewith, the at least one first drive sprocket positioned between at least two of the first set of bearing support members of the at least one support base; a second set of bearing support members supported in fixed relationship with the at least one support base, the second set of bearing support members spaced apart from the first set of bearing support members along the displacement axis, the second set of bearing support members each comprising at least one orifice;

a second set of sealed bearings threadably affixed to the second set of bearing support members;

a second shaft penetrating the at least one orifice of each of the second set of bearing support members; at least one second drive sprocket each comprising a second set of teeth, the at least one second drive sprocket coupled to the second shaft for rotation therewith, the at least one second drive sprocket positioned between at least two of the second set of bearing support members of the at least one support base;

a chain guide extending from the first set of bearing support members to the second set of bearing support members;

the traveling waste displacement assembly comprising:

a traveling guide configured to move along the chain guide between a retracted position and an extended position, the traveling guide translationally engageable with the chain guide; a wall carried at least in part by the traveling guide for translational movement therewith, the wall extending perpendicularly outward from the traveling guide and the chain guide;

and a roller chain trained about the first set of teeth and the second set of teeth, the roller chain coupled to the traveling guide; and a trailer.

10. The system of claim 9, wherein said at least one support base is affixed to the trailer.

* * * * *